3,822,144
THERMOPLASTIC FILM COMPOSITE FOR USE
AS A BONDING AGENT
Cecil H. Taylor, 1229 Romany Road,
Kansas City, Mo. 64113
No Drawing. Filed Aug. 24, 1971, Ser. No. 174,529
Int. Cl. B32b 31/12; C09j 7/00
U.S. Cl. 117—122 H                    11 Claims

ABSTRACT OF THE DISCLOSURE

A thermoplastic composite suitable for bonding textile materials and cellulosic sheets, upon the application of heat, the composition being a polymeric film, such as a polyethylene film, which has been treated, e.g., by coating, with an oligophenyl; the film composite is useful for mending apparel, for instance.

BACKGROUND OF THE INVENTION

Students, bachelors, executives, couriers, housewives, salesmen, secretaries, even royalty, everyone, at one time or other, is plagued with unexpectedly torn, burned or otherwise damaged clothing. This affliction, when it strikes, often cause social embarrassment, financial hardship or unwarranted waste; almost invariably, however, it is inconvenient and aggravating. Furthermore, not only apparel, but all textiles, as well as cellulosic sheet materials, may be afflicted. For example, expensive and inexpensive draperies, upholstery fabric, bed linen and coverings, sailcloth or other canvas, ladies' cloth bags, and a host of other such products are particularly vulnerable.

It is no wonder, therefore, that man has been trying for years to find a quick, convenient, easy and inexpensive cure for the affliction. One cure, namely reweaving, meets none of these criteria but it is superior as to several others, e.g., the re-woven area can be virtually undetectable and it is generally strong. Mending by stitching or sewing, on the other hand, while likewise strong, is usually limited to seams, buttonholes, undergarments and other like areas where conspicuousness is not a real problem.

Still another mending method has enjoyed a certain amount of popularity in recent years, and while it is quick convenient, easy and relatively inexpensive, it has been bothered with certain significant drawbacks. The method comprises placing over the damaged area of the fabric a patch having a solid, heat-deformable, adhesive coating on one side thereof which is put directly against the fabric substrate. Sufficient heat is applied to the resulting patch-substrate laminae to tackify the adhesive backing and adhere it to the substrate, pressure being likewise applied to the laminae to enhance bonding. A hot iron is generally the means used to apply heat and pressure. The patched substrate is then allowed to cool in order to let the adhesive solidify.

Since these patches are usually quite stiff due to the thickness of the adhesive backing, their use is generally limited to, say, certain play clothes, work clothes, home furnishing textiles, and the like, assuming the color and shape patch desired can be found. All too frequently, also, the patch lifts at its edges during use and eventually falls off or is intentionally peeled off for reasons of appearance and/or comfort.

One of the biggest uses for these patches is not for mending purposes but for decorative purposes. Teenagers in particular enjoy decorating their jeans, shirts, dungarees and skirts with multi-colored patches and are often not too concerned about thickness, stiffness, peeling, and other like characteristics which are intolerable in most dress wear. To help reduce peeling the instructions accompanying iron-on patches, as they are often called, generally quite specifically direct the user to round the corners of the patch.

Among the enemies of the patches presently on the market are laundering solutions and dry cleaning fluids; erosion of the adhesive occurs and the patch curls and separates from the substrate material.

Obviously, therefore, there is still a real need and demand for a quick, convenient, inexpensive and effective mending method which is versatile and provides a durable mend; there is a real need and demand for an alternative to the use of stiff, thick mending patches which readily peel at their edges and all too frequently do not match the fabric substrate when a match is desired; there is a real need and demand for a non-sew mending method and a bonding means which do not require professional skills and equipment in their use. The present invention, as will be better understood hereinafter, is directed to these ends.

THE INVENTION

According to the present invention a novel hot melt adhesive has been found which when used as a bonding agent for textiles and cellulosic sheet materials exhibits superior properties and obviates difficulties of the type hereinbefore discussed. More particularly, the instant discovery concerns a novel thermoplastic composition which, upon the application of heat thereto, can be melted and adhered to textiles and cellulosic sheet materials, forming a firm, lasting bond when subsequently allowed to cool and set.

Typically, the present invention relates to a thermoplastic composition, such as a polyethylene film or a vinylidene chloride-vinyl chloride copolymer film, treated with a small but effective amount of an oligophenyl, such as a terphenyl or chlorinated terphenyl. Preferably, the oligophenyl is uniformly distributed and sandwiched between two thin film laminae.

Also, typically, the oligophenyl-treated film laminae are sandwiched between a cloth patch and a cloth substrate and sufficient heat applied to the superposed layers to melt the treated laminae and adhere same to the opposed fabric. Upon cooling, the fabrics are tightly bonded to each other uniformly mending any tear or neatly sealing off any hole in the substrate.

Without being held to any specific theory, it is felt that the hot melt adhesive formed upon heating penetrates the interstices or inter-filamentary spaces of the opposed fabrics and, upon solidifying by cooling, provides a unitary matrix which is common to both fabrics and securely bonds same to each other.

Penetration of the interstices with the hot melt adhesive is significantly augmented and enhanced by applying pressure to the oposed fabrics having therebetween the hot melt adhesive composition of the present invention. A household pressing iron is particularly suitable for this process in that heat and pressure can be applied simultaneously and the amount of heat controlled to avoid scorching or, in the case of synthetic fabrics from polymeric fibers, deforming (e.g., by severe melting) the individual filaments. Most household irons have temperature dials which may be set for synthetic, cotton, wool, linen, and so-called permanent press, wash & wear fabrics.

It has been found, pursuant to the present invention, that superior results are achieved by cutting the thermoplastic patching film such that its peripheral edges are substantially parallel to the peripheral edges of the patch, which may have almost any configuration, the perimeter of the film, however, being greater than that of the patch. Thus the interposed patching film defines, preferably, a narrow border of film along the edges of the patch, which excess film, as will be explained more fully hereinafter, provides enhanced bonding where it really counts, viz., at the edges of the patch. The excess hot melt adhesive forms a stronger matrix in which are imbedded the cut fiber ends at the peripheral edges of the patch, thus resisting fraying, raveling and peeling.

According to still another embodiment of the present invention, a cellulosic sheet, such as a paper towel, a cloth, or the like, is placed over the patch totally covering same as well as the border of excess film sheet. Upon the application of heat and pressure to the resulting superposed layers, any excess hot melt adhesive not retained as a bonding matrix at the outer edges of the patch is absorbed by the cellulosic sheet.

Likewise, a cellulosic sheet or a cloth may be placed on the outer surface of the fabric substrate directly opposite the surface area against which the thermoplastic film is positioned. Preferably, the area covered by the cellulosic sheet or cloth is at least coextensive with the area covered by the thermoplastic film, so that any excess hot melt adhesive penetrating the loose edges of, say, a tear or worn spot, would be absorbed by the cellulosic sheet or cloth which is preferably removed before the adhesive is dried.

In the event that there is a hole in the fabric being mended, excess hot melt adhesive formed in the area within the edges of the hole can readily be collected by covering the hole and the surfaces adjacent same with a cellulosic sheet or a cloth disposed on the outer side of the fabric substrate.

The preferred oligophenyl compounds contemplated herein are the meta-, para-, and ortho-diphenyl benzenes and halogenated derivatives thereof, particularly the chlorinated phenylated benzenes. Mixtures of the several just-mentioned diphenyl benzenes, known as terphenyl or chlorinated terphenyl, are likewise very suitable for treating the thermoplastic films within the purview of the present invention.

Substituents other than halogens may be present on the phenyl moieties of the oligophenyls herein contemplated, so long as the substituents are relatively inert with respect to the thermoplastic component, the fabric patch and/or the fabric substrate. For example, lower alkyl-substituted lower alkoxy-substituted diphenyl benzenes or chlorinated diphenyl benzenes are suitable.

Other polyphenyls which may be used are diphenyl, quaternary phenyl, and the like, as well as substituted derivatives thereof, the substituents being halogen moieties and/or inert substituents of the type hereinabove illustrated with respect to oligophenyls. Of course, mixtures of any of these substituted or unsubstituted, halogenated or un-halogenated oligophenyls are herein contemplated.

The amount of oligophenyl used to treat the polymeric laminae of the present invention may range from about 0.75 to about 15 percent by weight, preferably from about 1 to about 8 percent, based upon the total weight of the film and the oligophenyl.

According to a preferred embodiment, the normally crystalline polyphenyl is dissolved in a suitable solvent, such as an aliphatic hydrocarbon, e.g., aliphatic mineral spirits, or a blend of the mineral spirits and an aromatic hydrocarbon solvent, e.g., benzene, toluene, xylene, and the like, and the resulting polyphenyl solution applied to a thin polyethylene film sheet substrate and the solvent removed by drying. Preferably, the solution-coated side or surface of the film sheet is, in turn, covered over with another similar sheet, thus forming a laminated composite having an oligophenyl coating between successive laminae. The laminating step may be carried out by passing the superposed layers of film through rollers, the solvent medium dissipating during the process and thereafter, leaving the oligophenyl coating evenly distributed on the opposed, contacting surfaces of the film sheets.

Other solvents for the polyphenyls herein contemplated may be employed, such as ketones, lower alkanols and esters thereof with alkanoic acids such as amyl acetate, and other like solvents, so long as the solvents do not deleteriously affect the polyvinyl or other polymeric film sheets within the purview of the instant discovery.

Still another method of applying an oligophenyl to polymeric sheets is to dust the normally crystalline oligophenyl uniformly over a surface of a molten laminar extrudate, i.e., an incipient film as it is emitted from a conventional film extruder. Upon cooling the film extrudate a thin layer of crystalline oligophenyl, such as 1,2-diphenyl benzene, is imbedded in the surface thereof. Of course, the thus-treated film sheet may be laminated with one or more similarly treated or untreated film sheets to form a multiple-layered patching film of the type suitable for use as taught herein.

Other methods of treating patching films with the polyphenyl compositions of the instant discovery involve dipping the film in solutions of the treating agent and then drying to remove the solvent. If desired, emulsions or colloidal dispersions of the oligophenyls may be used to treat the thermoplastic film surface to provide a well dispersed, uniformly distributed layer of oligophenyl solids on the surface.

The chlorine content of the chlorinated oligophenyls, such as the diphenyl benzenes, may vary considerably. While concentrations less than 20% by weight may be used, better results are achieved in the concentration range of about 20% to about 80%, preferably about 45% to about 60%.

While polyethylene films and vinylidene chloridevinyl chloride copolymer films (preferably, the 90–10 Saran copolymers, usually plasticized) have been discussed hereinbefore as preferred thermoplastic compositions, the present invention is by no means limited thereto. Other thermoplastic films may be used, such as those produced from polyethylene blends with minor amounts of polyisobutylene or polyvinyl butyl ethers; chlorinated (minor amount) polyethylene and copolymers thereof; vinylidene chloride polymers; polyvinyl chloride; interpolymers of polyethylene and vinyl acetate and their hydrolyzed derivates, viz, ethylene-vinyl alcohol interpolymers; and other like film-forming thermoplastic polymers end copolymers which have low softening and melting points relative to synthetic fibrous materials, such as polyesters [e.g., poly (ethylene terephthalate)], nylons [e.g., poly (hexamethylene adipamide), polycarpoamide], acrylics, etc.

While a wide range of thermoplastic film thicknesses is contemplated herein, best results are achieved as to, say, apparel fabrics, using thicknesses in the range of about 0.4 to about 5.5 millimeters, preferably from about 0.90 to about 3.7 millimeters. Of course, as indicated hereinbefore, several laminae may be superposed and carry oligophenyl treating agent sandwiched between successive laminae. Consequently, the overall thickness of the laminated composite could be substantially greater than 5.5 millimeters. For heavy duty patching, such as in mending canvas, upholstery and drapery textiles, film sheet thicknesses on the order of about 6.0 to 15 millimeters or greater, may be employed.

While much has been said about mending fabric, it should be pointed out that the thermoplastic film compositions of the present are eminently suited for non-sew hemming of apparel (e.g., skirts and blouses), bed sheets, curtains, and other like textile materials. The film composition may be placed between the overlapping hem fabric and the opposed fabric substrate, and heat and pressure applied to the resulting sandwiched layers, as taught hereinbefore when using a patch. Likewise, the film sheet may be cut such that its edges parallel those of the superposed hem fabric but extend outside said edges providing excess hot melt adhesive at the raw edges of the hem fabric.

Alternatively, hemming may be accomplished by seam binding, i.e., by turning a hem and centering a strip of the thermoplastic film sheet over the raw edges of the hem and superimposing a tape or binding which is then pressed with a iron hot enough to melt the film. The tape may or may not have a woven edge. In either case, it is preferable to cut the strip of thermoplastic material of the present invention wider than the tape or binding for the reasons hereinbefore fully stated. Also, cellulosic sheets, such as paper towels, cloth, or the like, may likewise be used advantageously to absorb excess hot melt adhesive.

The versatility of the present invention is another of its stronger attributes. For example, holes in fabrics can be mended with a matching cloth patch, even to the design (or any portion thereof) which was burned or torn out of the fabric; emblems can be readily affixed to uniforms; paper can be bonded to paper; paper can be bonded to cloth, and vice versa; photographs can be mounted in albums; book covers can be mended; etc. Applications of the present invention appear limited only by the ingenuity of the individual practicing the invention. When bonding paper, the film composition is preferably cut to match the dimensions of the paper.

Among the many fabric substrates within the purview of the present invention are those made of fibers including cotton, wool, rayon, silk, linen, acetates, polyesters, polyamides, acrylics, modacrylics, and various blends and textures of these, including corduroys, velvets, velours, satin, tricot, and the like. Of course, so-called permanent press and wash & wear fabrics are likewise herein contemplated

EXAMPLES

The present invention will best be understood from the following examples which are intended to be illustrative only and not limitative of the scope of the present invention encompassed by claims hereto appended.

Example I

A 50% solution of terphenyl in amyl acetate as the solvent is used to coat one surface of a polyethylene film, one millimeter in thickness. A second one-millimeter thick polyethylene film is placed over the solution-coated side of the first film and the resulting laminated sheet pressed between rollers and dried. The product two-ply film sheet contains about 2% terphenyl solids sandwiched between the laminae.

A lady's summer cotton dress fabric having a two-inch, L-shaped tear therein is mended by cutting a circular patch, 2½ inches in diameter, of the same fabric, cutting a matching patch, 2⅝ inches in diameter, from the above terphenyl-coated, two-ply polyethylene film sheet; placing the round film sheet directly over the tear in the dress fabric (substrate) so that the edge of the tear nearest any edge of the sheet is at least about ½ inch away; superimposing the round fabric patch such that its edges parallel the edges of the film patch; covering over, completely, the superposed layers with a paper towel; and applying a dry, hot electric iron, whose dial is set at "cotton" (about 400° F.), to the four (4) layers, pressing firmly for at least about 10 or 12 seconds, or until the film melts.

Upon removing the iron and allowing the polymer melt to solidify, the paper towel being removed, a clean patch is firmly mended to the fabric substrate, the film sheet having, as it were, disappeared into the interstices of the opposed fabric surfaces as a hot melt adhesive Example II Example I is repeated in every essential respect with the exception that there is not an L-shaped tear but a round hole (¾-inch diameter) in the dress fabric and an additional sheet of paper towel on the outer surface of the fabric substrate covers the hole and the surfaces adjacent the edges of the hole. Upon heating the superposed layers, the excess hot melt adhesive circumscribed by the edges of the hole, and not taken up by either the fabric substrate or cloth patch, is absorbed by the paper towel covering the hole.

Example III

Example I is repeated in every essential respect with the exception that the substrate and patch are made of wool fabric, and the iron is set at the temperature recommended for pressing the fabric.

Example IV

Example II is repeated in every essential respect with the exception that the substrate fabric and patch are made of nylon 6/6 fibers, and the iron is set at the temperature recommended for pressing the fabric.

Example V

Example II is repeated in every essential respect with the exception that the substrate fabric and patch are made of 50/50 blend of nylon 6 and cotton fibers, and the iron is set at the temperature recommended for pressing the fabric.

Example VI

Example II is repeated in every essential respect with the exception that the substrate fabric and patch are made of poly(ethylene terephthalate) fibers, and the iron is set at the temperature recommended for pressing the fabric.

Example VII

Example VI is repeated in every essential respect with the exception that each film lamina is a plasticized vinylidene chloride-vinyl chloride (90–10) Saran copolymer, the lamina is 2.0 millimeters in thickness, the treating agent is ortho-diphenyl benzene and the percent of the agent, based upon the total weight of the film and treating agent, is 9 percent by weight.

Example VIII

Example IV is repeated in every essential respect with the exception that the treating agent is chlorinated terphenyl, containing 60% chlorine, and the percent of the agent, based upon the total weight of the film and treating agent, is 3.5 percent by weight.

Pursuant to statutory requirements, there are described above the invention and what are now considered its best embodiments. It should be understood, however, that the invention can be practiced otherwise than as specifically described, within the scope of the appended claims.

What is claimed is:

1. A thermoplastic composition suitable for bonding textile materials and cellulosic sheets, upon the application of heat, which consists essentially of a lamina selected from a polyethylene film and a vinylidene chloride-vinyl chloride copolymer film having coating thereon or imbedded therein from about 0.75 to about 15 percent by weight of an oligophenyl, based upon the total weight of the lamina and oligophenyl.

2. The thermoplastic composite of claim 1 wherein the lamina is coated with from about 0.75 to about 15 percent by weight, based upon the total weight of the lamina and coating, of an oligophenyl.

3. The thermoplastic composite of claim 2 wherein the lamina is coated with from about 1 to about 8 percent by weight, based upon the total weight of the lamina and coating, of an oligophenyl.

4. The thermoplastic composite of claim 2 wherein the oligophenyl is terphenyl.

5. The thermoplastic composite of claim 2 wherein the oligophenyl is chlorinated terphenyl.

6. The thermoplastic composite of claim 5 wherein the chlorine content of the chlorinated terphenyl is from about 20% to about 80% by weight.

7. The thermoplastic composite of claim 6 wherein the chlorine content of the chlorinated terphenyl is from about 45% to about 60% by weight.

8. The thermoplastic composite of claim 1 wherein the thickness of the lamina is in the range of about 0.4 to about 5.5 millimeters.

9. The thermoplastic composite of claim 1 wherein the thickness of the lamina is in the range of about 0.90 to about 3.70 millimeters.

10. The thermoplastic composite of claim 2 wherein the lamina is polyethylene film.

11. The thermoplastic composite of claim 2 wherein the lamina is vinylidene chloride-vinyl chloride copolymer film.

References Cited

UNITED STATES PATENTS

| | | | |
|---|---|---|---|
| 3,117,100 | 1/1964 | Cox et al. | 260—23.7 |
| 3,600,347 | 8/1971 | Godar | 260—27 |
| 3,215,552 | 11/1965 | Halcomb et al. | 117—4 |
| 3,356,635 | 12/1967 | Heer et al. | 260—32.8 |

CHARLES E. VAN HORN, Primary Examiner

R. A. DAWSON, Assistant Examiner

U.S. Cl. X.R.

117—122 PA, 122 PF, 138.8 E, 138.8 UA; 156—94, 309, 313, 333, 334; 161—88, 167, 247

UNITED STATES PATENT OFFICE
CERTIFICATE OF CORRECTION

Patent No. 3,822,144　　　　　　　　　Dated July 2, 1974

Inventor(s) Cecil H. Taylor

It is certified that error appears in the above-identified patent and that said Letters Patent are hereby corrected as shown below:

Column 4, line 29, "Saran" should read -- saran --; line 40, "end" should read -- and --. Claim 1, line 1, "composition" should read -- composite --. Claim 1, line 5, "coating" should read -- coated --.

Signed and sealed this 29th day of October 1974.

(SEAL)
Attest:

McCOY M. GIBSON JR.　　　　　　　　C. MARSHALL DANN
Attesting Officer　　　　　　　　　　Commissioner of Patents